United States Patent [19]
Curtet

[11] Patent Number: 5,657,262
[45] Date of Patent: Aug. 12, 1997

[54] ARITHMETIC AND LOGIC COMPUTATION DEVICE AND CONTROL METHOD

[75] Inventor: Joël Curtet, Fontaine, France

[73] Assignee: SGS-Thomson Microelectronics, S.A., Gentilly Cedex, France

[21] Appl. No.: 423,406

[22] Filed: Apr. 18, 1995

[30] Foreign Application Priority Data

Apr. 19, 1994 [FR] France ................... 94 04655

[51] Int. Cl.$^6$ ..................... G06F 7/38
[52] U.S. Cl. ..................... 364/736.02
[58] Field of Search ..................... 364/736

[56] References Cited

U.S. PATENT DOCUMENTS

| 4,755,965 | 7/1988 | Mary et al. | 364/900 |
|---|---|---|---|
| 5,423,052 | 6/1995 | Oonishi et al. | 364/736 |

FOREIGN PATENT DOCUMENTS

| 0136834 | 4/1985 | European Pat. Off. . |
|---|---|---|
| 0173383 | 3/1986 | European Pat. Off. . |
| 0307083 | 4/1991 | Japan . |
| 9325959 | 12/1993 | WIPO . |

OTHER PUBLICATIONS

"Evolving DSP Chips Do More", Dave Bursky, Electronic Design International, vol. 38, No. 23, Dec. 13, 1990, pp. 51–63.

Primary Examiner—Tan V. Mai
Attorney, Agent, or Firm—Robert Groover; Betty Formby; Matthew Anderson

[57] ABSTRACT

An arithmetic and logic computation device having an arithmetic and logic unit with a shifter on at least one input. The computation device, which includes a multiplier, propagates a carry and applies a carry to the multiplier to carry out double precision multiply and multiply-accumulate operations.

29 Claims, 2 Drawing Sheets

ARITHMETIC AND LOGIC COMPUTATION DEVICE AND CONTROL METHOD

CROSS-REFERENCE TO RELATED APPLICATION

This application claims priority from French App'n 94-04655, filed Apr. 19, 1994, which is hereby incorporated by reference. However, the content of the present application is not necessarily identical to that of the priority application.

BACKGROUND AND SUMMARY OF THE INVENTION

The invention relates to an arithmetic and logic computation device and a control method. This device and this method can be applied notably to all arithmetic processors or signal processors. It can be used to carry out double precision computations, especially double precision multiply (or multiplication) operations and multiply-accumulate (or multiplication-accumulation) operations.

Carrying out double precision or multi-precision computations implies working with operands that are greater than the data buses, for example working with 32-bit operands on 16-bit data buses.

To carry out multiplication-accumulation operations, a multiplier and an arithmetic and logic unit are used. The multiplier carries out the multiplication between two operands and places the product in a register. The arithmetic and logic unit adds the product to the result contained in an accumulation register.

To carry out double precision multiply operations, when the multiplier accepts operands having the width of the data bus at input, it is necessary to compute elementary products and add these products to obtain the result of the multiplication.

An elementary product is defined as a product computed with operands having the width of the data bus. In the case of a 16-bit data bus, for a double precision multiply operation on 32-bit operands, each formed by a word of 16 most significant bits and 16 least significant bits, four elementary products are computed: the product of the two least significant words and, the product of the two most significant words and the two "crossed" products of the least significant word of one operand crossed with the most significant word of the other operand. The elementary products are expressed on 2×16 bits.

One of the problems encountered is that of adding the different elementary products together to obtain the final result on 2×32 bits and, for a multiplication-accumulation operation, of adding these elementary products to an intermediate result. To add the 32-bit elementary products properly, they must be aligned at the right place in the window of the 64-bit result. For this purpose, if necessary, the intermediate result is shifted and the elementary product is added to it. The intermediate result should therefore be saved before the shifting so as not to lose bits in the result, which makes it necessary to manage different pointers in the memory. For example, if there is a 16-bit multiplier and a 32-bit adder and if it is desired to multiply two 32-bit numbers x1x0 and y1y0 (x1, y1 representing the most significant word and x0, y0 representing the least significant word) and accumulate this product in a 32-bit accumulator, $A = A_{high} + A_{low}$ ($A_{high}$ representing the 16 most significant bits and $A_{low}$ representing the 16 least significant bits), the following different operations will be carried out:

x0*y0+A in A
$A_{low}$ in m0
x1*y0+A*$2^{-16}$ in A
x0*y1+A in A
$A_{low}$ in m1
x1*y1+A*2−16 in A.

Since all these additions are done on the accumulator and since this accumulator is always shifted to the right, the carry and the sign bit propagate naturally in the accumulator.

To obtain multiplication-accumulation loops, it is necessary to carry out operations on the memory zones m0 and m1 and on the accumulator A, since the result is no longer aligned and since it is partly in m0 (16 least significant bits), partly in the accumulator (32 most significant bits) and partly in m1 (16 middle bits). This increases the number of instruction cycles necessary and may entail heavy penalties.

It is an object of the invention to facilitate the double precision and more generally the multi-precision operations, notably by avoiding memory operations. It is also an object of the invention to reduce the number of instruction cycles needed for such operations.

According to the invention, a shifter is placed on an input of the arithmetic and logic unit. To add a crossed product of the x0*y1 type, this product is applied to the arithmetic and logic unit, to the input with shifter. Thus, it is the product that is aligned with the accumulator and not the contrary.

As claimed, the invention relates to an arithmetic and logic computation device comprising an arithmetic and logic unit. According to the invention, a shifter is provided on at least one input of the arithmetic and logic unit.

Advantageously, the shifter is a barrel shifter. A shifter of this kind is very flexible in its use, enabling logic and arithmetic shifting operations.

The computation device according to the invention furthermore comprising at least two accumulators, one multiplier and one control unit, can be used to carry out instructions for the double accumulation of a product computed by a multiplier, with a first accumulation on a first accumulator with a rightward arithmetic shift of the product and a second accumulation on a second accumulator with a leftward shift of the product.

However, by carrying out two accumulations on two different accumulators, the natural propagation of the carry is lost in the multiplication-accumulation operations.

In the invention, there is provision for means to propagate the carry. Preferably, the arithmetic and logic computation unit having a first register to memorize the carry computed in the current operation and to give this carry in the next operation, the propagation means include a first circuit and a second register, the first circuit being controlled by a control signal delivered by the control unit to save the carry computed by the arithmetic and logic unit either in the first register or in the second register. The first circuit is advantageously a multiplexer/demultiplexer.

According to a second characteristic of the invention, the arithmetic and logic computation device comprises a second circuit controlled by the control unit for the application or non-application of the carry memorized in the first register, to the stage of computing the least significant bit in the multiplier. The second circuit is advantageously an AND gate receiving, at input, the output of the first register and a binary control signal delivered by the control unit.

The invention also relates to a method for the control of a computation device comprising a multiplier with an associated product register, an arithmetic and logic unit with two inputs and at least one shifter at one input of the arithmetic and logic unit. According to the invention, the control method consists, for an instruction comprising an accumulation in an accumulator and a multiplication, in:

applying the contents of the product register to an input of the arithmetic and logic unit and sending a computation signal of the accumulation to the arithmetic and logic unit;

sending a signal for the computation of a new product to the multiplier.

The invention also relates to a control method for the computation of a double accumulation of a product comprising a word of n most significant bits and a word of n least significant bits, the arithmetic and logic unit comprising at least one first accumulator and one second accumulator, a first register to memorize the carry computed by the arithmetic and logic unit for the current instruction and a second register. According to the invention, the control method consists upon the reception of an instruction comprising a double accumulation of the product, in:

the protection of the first carry register, to keep the carry computed in the previous instruction;

the application of the contents of the product register to the input with shifter;

a first accumulation of the contents of the product register arithmetically shifted by n bits towards the left by the shifter with the contents of the first accumulator, with memorization of the carry in a second register;

a second accumulation of the contents of the product register shifted arithmetically by n bits to the right by the shifter with the contents of the second accumulator and the carry bit memorized in the second register.

To compute a double precision multiplication of two operands, each operand of the product to be computed comprising a word of n most significant bits and a word of n least significant bits, the control method according to the invention further activates, in parallel with the second accumulation, a multiplication operation by the application or non-application of the carry contained in the first register to the computation stage of the least significant bit of the product in the multiplier.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
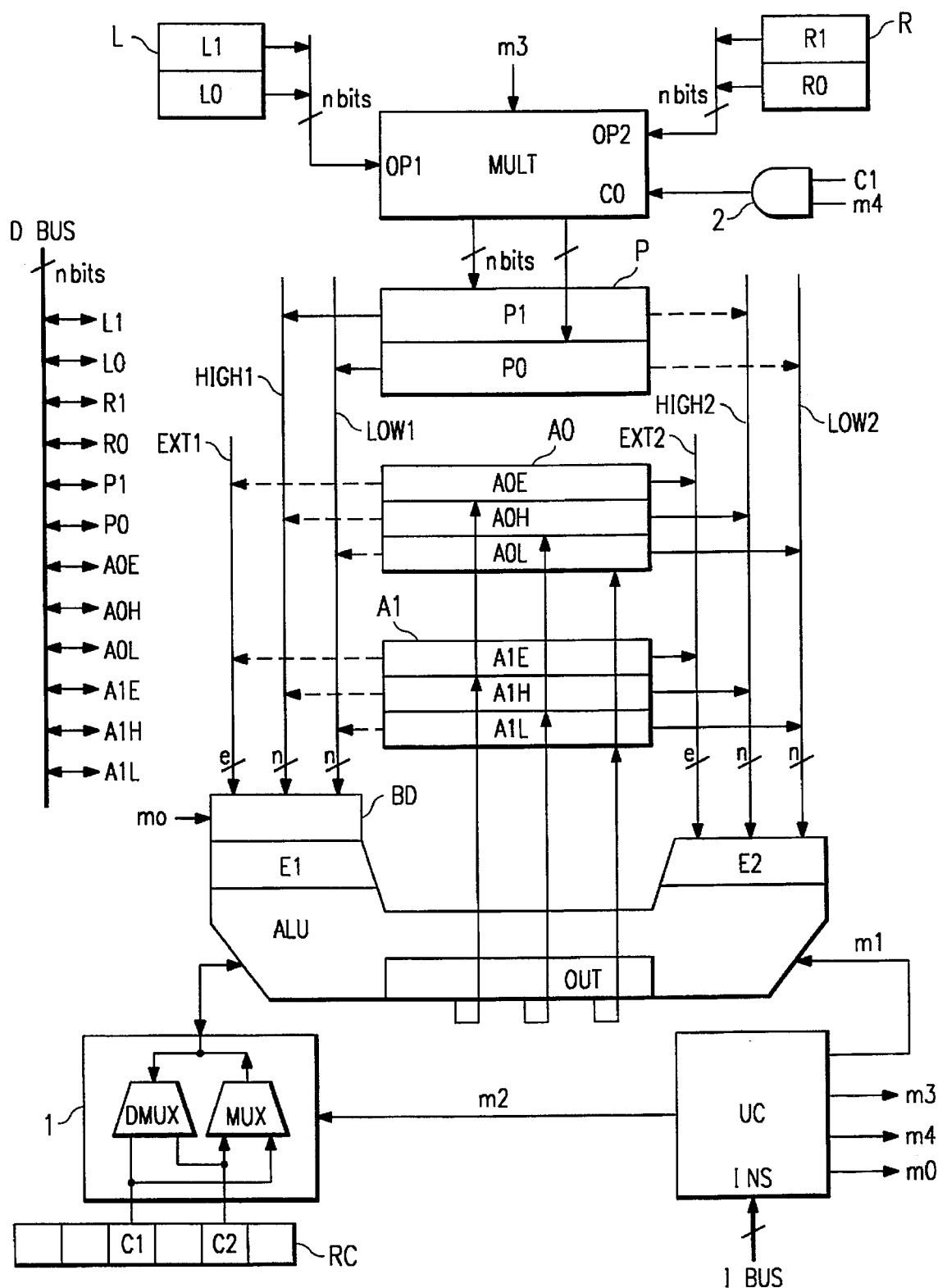
FIG. 1 shows an architecture of an arithmetic and logic computation device according to the invention.

The numerous innovative teachings of the present application will be described with particular reference to the presently preferred embodiment (by way of example, and not of limitation), in which:

The arithmetic and logic computation device shown in FIG. 1 has a control unit UC to drive the different circuits of the computation device, notably an arithmetic and logic unit ALU and a multiplier MULT. The control unit receives an instruction INS, for example, from an instruction bus IBUS (using the standard architecture of signal processors known as the HARVARD architecture). It delivers different control signals (m0, . . . , m4) as a function of this instruction.

The arithmetic and logic unit is capable of carrying out standard arithmetic and logic instructions (addition, subtraction, XOR, comparison, etc.). It has at least two data inputs E1 and E2. On at least one input, for example in the input E1 (FIG. 1), a shifter BD is provided. Preferably, it is a barrel shifter that enables arithmetic and logic shifts. An arithmetic and logic unit delivers a result at an output OUT preferably associated with at least two output registers A0 and A1 called accumulators. These accumulators may also give data elements to the inputs E1 and E2 of the arithmetic and logic unit.

A first register C1 and a second register C2 are designed to memorize and give the carry computed by the arithmetic and logic unit. A circuit 1, controlled by the control unit UC, enables the selection of that one of the two registers C1 or C2 that memorizes and gives the carry for the operation in progress. In fact, at the start of the computation, the selective register gives the arithmetic and logic unit the carry that it has memorized. At the end of the computation, it memorizes the new carry. The register selected by default is the register C1.

Preferably, the circuit 1 has a multiplexer/demultiplexer receiving firstly the carry signal of the arithmetic and logic unit and, secondly, on a first channel, the output of the register C1 and, on a second channel, the output of the register C2. Depending on its state, the control signal m2 activates either the first channel or the second channel.

Generally, as shown in FIG. 1, the first register C1 and the second register C2 are a first bit and a second bit of a conditions register RC associated with the arithmetic and logic unit. This conditions register RC memorizes or gives different information elements (carry, sign, capacity overflow, etc.) delivered or used by the arithmetic and logic unit on the current operations. Hereinafter, the registers C1 and C2 are identified with the bits of the conditions register. It will be noted that the bit C1 is the default carry bit and that the bit C2 provided for in the device of the invention is used only upon the command of the control unit.

The computation device also has a multiplier MULT. In order to have an optimum computation speed, it is preferably a parallel multiplier. However, other forms of architecture may be chosen depending on the application (series or parallel-series multiplier). The multiplier has two inputs 0P1 and 0P2 to receive the operands. These operands are given, in the example, by two source registers L and R. The multiplier also has an input C0 connected to the output of a circuit 2 to apply the carry to the computation stage (not shown) for the computation of the least significant bit of the product. Preferably, the circuit 2 has an AND logic gate that receives, as inputs, the bit C1 and a binary control signal m4 given by the control unit. The multiplier delivers the result of the multiplication in a product register P.

In the example of FIG. 1, the data elements are presented on n bits and the arithmetic and logic unit is a double precision unit with, in the example, an extension on e bits. A data bus DBUS is shown. Through this bus, the data elements are written or read in the different data registers: product register P, source registers L and R or accumulators A0 and A1. This data bus, which has a width of n bits, is connected to a memory space (not shown).

The multiplier operates on n-bit input operands and gives a result in the register P on 2×n bits. The register P is divided into two n-bit sub-registers P1 and P0 that are accessible separately from the data bus. The sub-register P1 receives the n most significant bits of the product and the sub-register P0 receives the n least significant bits of the product.

The source registers L and R are each divided into two sub-registers accessible separately from the data bus, one sub-register (L1, R1) for the n most significant bits and one sub-register (L0, R0) for the n least significant bits.

The accumulators A0 and A1 are each divided into three sub-registers that are accessible separately from the data bus: a first sub-register (A0E, A1E) for the e extension bits, a second sub-register (A0H, A1H) for the n most significant bits and a third sub-register (A0L, A1L) for the n least significant bits.

The inputs E1 and E2 of the arithmetic and logic unit are similarly divided into three sub-groups corresponding to three local buses:

a first local bus EXT1, EXT2 that can receive the contents of the sub-registers containing the extension bits (A0E, A1E);

a second local bus HIGH1, HIGH2 that can receive the contents of the sub-registers dedicated to the n most significant bits; and a third local bus LOW1, LOW2 that can receive the contents of the sub-registers dedicated to the n least significant bits.

FIG. 1 does not show all the possible links between the local buses of the inputs E1 and E2 and the sub-registers, firstly so as not to excessively burden the figure and, secondly, because these links vary according to the architecture. Furthermore, only one data bus DBUS is shown, again for simplicity's sake. However, certain types of architecture use, for example, two data buses each connected to a different memory space.

FIG. 1 shows only the effective links for the multiplication or multiplication-accumulation operations according to an exemplary embodiment of the invention.

For operations such as these, the contents of the product register P are applied to the input E1 with the shifter of the arithmetic and logic unit (P1 on the n most significant bits and P0 on the n least significant bits) and one accumulator (A0) or the other (A1) is applied to the input E2 of the arithmetic and logic unit (AiE on the e extension bits, AiH on the n most significant bits and AiL on the n least significant bits, with i=0 or 1).

The output OUT of the arithmetic and logic unit is written in the same accumulator as the one applied to the input E2.

On an accumulation-multiplication instruction according to the invention, the control unit applies the contents of the product register to an input of the arithmetic and logic unit, sends a signal (m1) for the computation of the accumulation to the arithmetic and logic unit and sends a signal (m3) for the computation of a new product to the multiplier.

According to the invention, upon reception of a double accumulation instruction INS at the product register, the control unit UC activates the application of the contents of the register P to the input E1 of the arithmetic and logic unit with the shifter and the application of the contents of the first accumulator, for example A0, to the input E2 and activates a control signal (m2) on the circuit 1 for the protection of the carry bit C1 so that the carry bit is memorized or read in the bit C2. Then, it initializes (control signal m0) the shifter BD with an n-bit shift towards the left. In a first instruction cycle, upon reception of a command for the computation of accumulation on the control signal m1, the arithmetic and logic unit carries out its computation, memorizes the result in the first accumulator A0 and memorizes the carry in the bit C2. The control unit then initializes the shifter with an arithmetical shift of n bits towards the right and applies the contents of the second accumulator A1 to the input E2 of the arithmetic and logic unit. In a second instruction cycle, it sends a second accumulation command m1 to the arithmetic and logic unit. The arithmetic and logic unit adds up the two inputs with the carry of the previous addition stored in the bit C2 and accumulates the result in the accumulator A1.

For an instruction of double accumulation of the product register and of multiplication, in the second cycle, the control unit, in parallel with the command for the second accumulation, sends a computation control signal m3 to the multiplier. The new product is memorized in the product register. At the end of the second instruction cycle, the control unit deactivates the binary control signal m2 and reinitializes the shifter with a zero shift.

If the instruction is a instruction of double accumulation and multiplication with a carry, the control unit activates the control signal m4 also at one to validate the application of the carry bit C1 to the input C0 of the multiplier and deactivates the binary signal m4 at zero at the end of the second instruction cycle.

The computation device can be used to perform double precision multiplication-accumulation operations in a very simple way with a result that is perfectly aligned on both accumulators. The result of the multiplication-accumulation is put into the accumulator A0 for the least significant bits and into the accumulator A1 for the most significant bits. With the architecture shown in FIG. 1, where the arithmetic and logic unit and the accumulators are extension accumulators, the extension part of the accumulator A0 (A0E) is not significant. The extension part of the accumulator A1 (A1E) represents the possible extension of the sign of the result. The invention can also be applied to arithmetic and logic units without extension.

Figure 2:
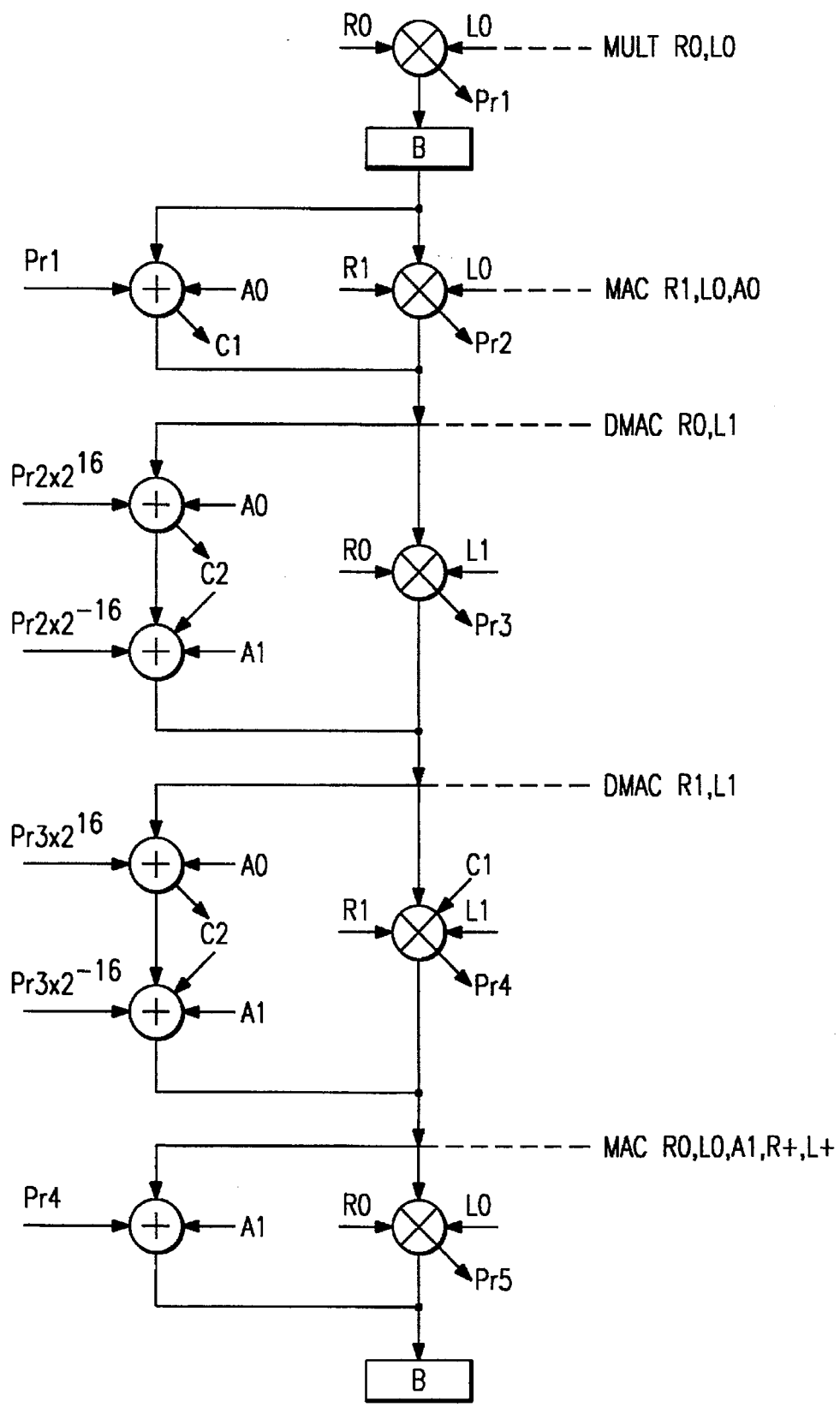
FIG. 2 shows a flow chart of the operations for a double precision multiplication-accumulation in an arithmetic and logic computation device according to the invention.

FIG. 2 shows a flow chart of a loop for the computation of multiplication-accumulation with a computation device according to the invention.

The operands to be multiplied are placed in the registers R and L. In the example of FIG. 2, n has been chosen as being equal to 16. The source registers (R, L) and product register (P) are therefore 2 by 16-bit registers.

Before returning to the multiplication-accumulation computation loop it is necessary, first of all, to compute a first product Pr1 since the principle of the invention consists in accumulating the previous product and in computing the next product.

The control method therefore begins with an instruction for computing the product Pr1 of the least significant words R0, L0 of the first two operands (MULTR0,L0). The multiplier is activated and the product is put into the register P.

An entry is then made into the loop at the input point B, which starts with an accumulation-multiplication instruction (MACR1,L0,A0): a computation is made in the same instruction cycle of the accumulation of the previous product Pr1=R0.L0 in the accumulator A0, and a first crossed product Pr2, namely the product of the most significant word of an operand, for example R1, with the least significant word of the other operand, L0 in the example. The accumulation generates a carry memorized in the bit C1.

The next instruction is then a double accumulation-multiplication instruction (DMACR0,L1):

In the first instruction cycle, the arithmetic and logic unit computes a first accumulation of the previous product Pr2 with a 16-bit shift to the left with the accumulator A0. The accumulation generates a carry stored in the bit C2.

In the second instruction cycle, the arithmetic and logic unit computes a second accumulation of the previous product Pr2 with a 16-bit arithmetic shift to the right with the accumulator A1, and with the carry memorized in the bit C2. At the same time, the multiplier computes the second crossed product Pr2, in the example Pr3=R0.L1.

Then there is a double accumulation-multiplication instruction with carry (DMACR1,L1,C0):

In a first instruction cycle, the arithmetic and logic unit computes a first accumulation of the previous product Pr3 with a 16-bit shift to the left with the accumulator A0. The accumulation generates a carry stored in the bit C2.

In the second instruction cycle, the arithmetic and logic unit computes a second accumulation of the previous product Pr3 with a 16-bit arithmetic shift to the right with the accumulator A1, and with the carry memorized in the bit C2. At the same time, the multiplier computes the product Pr4 of the most significant words by applying the carry bit C1 to the input C0 of the multiplier: PR4=R1.LI+C1. And the source registers R and L are loaded with the following operands (R+,L+).

Finally, there is a single accumulation-multiplication instruction (MACR0,L0,A1). The arithmetic and logic unit computes the accumulation of the previous product Pr4 with the accumulator A1, and the multiplier computes the product Pr5 of the least significant words Pr5=R0.L0. The operation can go back to B for the second computation loop.

The control method for a double precision multiplication-accumulation method presented herein is valid for numbers represented in fixed decimal-point mode, signed numbers, integers or fractions. It will be noted that the multiplication of the least significant words is a multiplication of unsigned numbers, while that of the most significant words is a multiplication of signed numbers and crossed products are obtained by the multiplication of a signed number with an unsigned number. The management of the type of product to be computed in the multiplier MULT is achieved by the control unit.

To carry out a double precision multiplication without accumulation, it is enough, instead of the last multiplication-accumulation instruction MAC, to carry out a simple accumulation on the accumulator A1, the accumulators A0 and A1 being initialized at zero at the start of the computation. It will be noted that, for a double precision multiplication without accumulation, it is not necessary to apply the carry bit C1 to the multiplier for the computation of the product of the most significant words, for the first product of the least significant words is accumulated, in this case, with a reset accumulator, necessarily implying a zero carry.

The computation device according to the invention therefore enables double precision multiplication or multiplication-accumulation operations that are greatly facilitated.

As a rule, the shifter placed on at least one input of the arithmetic and logic unit enables the handling of data elements without its being necessary to modify the contents of the accumulators: the aligning is done on the data elements and no longer on the accumulators. This applies as much to additions and subtractions as to all the bit handling operations.

The arithmetic and logic computation device according to the invention is not limited to the architecture shown in FIG. 1. In particular, other bus architectures are possible. There may be other registers or other computation units. The ways used to manage the registers linked with the memory spaces are not indicated but are achieved according to the different possibilities offered by the prior art.

The device herein disclosed is found in several products produced by SGS-Thomson Microelectronics, the D950 (DSP 16 bits, 40 MHz, 0.5 µm), and the ST18951 (ASIC with D959 and peripheries, for GSM telephony applications).

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. An arithmetic and logic computation device with a control unit comprising:

a multiplier with an output product register applicable to an input with a shifter of an arithmetic and logic unit with at least two output accumulators;

a first register and a second register to memorize and propagate carry values generated by a current operation to a following operation of said arithmetic and logic unit;

wherein, to enable double precision multiply-accumulate operations on operands, a first circuit selects either said first register to store a first one of said carry values generated during a first computation performed on the least significant parts of the operands or said second register to store a second one of said carry values generated during the other computation cycles, and a second circuit enables the application of the contents of said first register to an input of the multiplier in order to integrate these contents into the multiplication cycle performed on the most significant parts of the operands.

2. The computation device of claim 1, wherein said first circuit is a multiplexer-demultiplexer with first and second channels, said first channel connected to said first register and said second channel connected to said second register, said first circuit receiving a control signal from the control unit to validate either said first channel or said second channel.

3. The computation device of claim 1, wherein said second circuit is an AND gate receiving, as inputs, a binary control signal from the control unit and having its output applied to an input of the multiplier.

4. The arithmetic and logic computation device of claim 1, wherein the shifter at input of the arithmetic and logic unit is a barrel shifter.

5. The arithmetic and logic computation device of claim 1, wherein, for each crossed product computed by said multiplier, said shifter thereafter receives a first command for alignment on one of said accumulators to enable the addition of the contents of said product register with the contents of that one of said accumulators and for storage of said second one of said carry values in said second register, said shifter thereafter receives a second command for alignment on the other of said accumulators to enable the addition of the contents of said product register with the contents of that one of said accumulators with said second one of said carry values memorized in said second register being taken into account.

6. A method for the use of an arithmetic and logic computation device with a control unit for the computation of a double accumulation of a product comprising the steps of:

providing a multiplier with an output product register applicable to an input with a shifter of an arithmetic and logic unit with at least two output accumulators;

providing a first register and a second register to memorize and propagate carry values generated by one current operation to the following operation of said arithmetic and logic unit;

activating a first circuit to either select said first register to store a first one of said carry values generated during a first computation performed on the least significant parts of the operands or to select said second register to store a second one of said carry values generated during other computation cycles; and activating a second circuit to apply the contents of said first register to an input of said multiplier in order to integrate the contents into the multiplication cycle performed on the most significant parts of the operands.

7. The method of claim 6, wherein said first circuit receives a control signal from the control unit to validate either a first channel connected to said first register or a second channel connected to said second register of a multiplexer-demultiplexer.

8. The method of claim 6, wherein said shifter at the input of said arithmetic and logic unit is a barrel shifter.

9. The method of claim 6, wherein, for each crossed product computed by said multiplier, said shifter thereafter receives a first command for alignment on one of said accumulators to enable the addition of the contents of said output product register with the contents of that one of said accumulators and for storage of said second one of said carry values in said second register, said shifter thereafter receives a second command for alignment on the other of said accumulators to enable the addition of the contents of said product register with the contents of that one of said accumulators with said second one of said carry values memorized in said second register being taken into account.

10. A arithmetic and logic computation device for carrying out double-precision operations on operands, comprising:

a control unit connected to deliver a plurality of control signals;

a arithmetic and logic unit having an output connected to deliver a carry value to one of at least two accumulators, and having at least two inputs, wherein at least one of said inputs has at least one shifter;

a first circuit being controlled by one of said control signals, said first circuit connected to select one of at least two registers to memorize and propagate said carry value;

a second circuit having an input connected to receive said carry value propagated by one of said registers of said first circuit and to receive one of said control signals; and a multiplier having a plurality of inputs, wherein at least two of said inputs are connected to receive operands, and wherein another of said inputs is connected to an output of said second circuit to receive said carry value and to apply said carry value to the multiplication stage, said multiplier having an output connected to deliver the results of the multiplication stage in a product register;

wherein the results in said product register are applied to one of said inputs having at least one of said shifters of said arithmetic and logic unit, and said carry value in one of said accumulators is applied to another of said inputs of said arithmetic and logic unit.

11. The device of claim 10, wherein said first circuit comprises a multiplexer/demultiplexer connected to receive said carry value of said arithmetic and logic unit, said multiplexer/demultiplexer having first and second channels, said first channel connected to receive the output of one of said registers, said second channel connected to receive the output of the other of said registers, wherein one of said control signals activates either said first or second channel.

12. The device of claim 10, wherein one of said shifters is a barrel shifter.

13. The device of claim 10, wherein said registers of said first circuit define a conditions register associated with said arithmetic and logic unit, wherein said conditions register is connected to memorize and deliver information elements delivered or used by said arithmetic and logic unit.

14. The device of claim 10, wherein said multiplier is a parallel multiplier.

15. The device of claim 10, further comprising at least two source registers connected to deliver the operands to at least two of said inputs of said multiplier.

16. The device of claim 10, wherein said second circuit is an AND logic gate.

17. The device of claim 10, wherein said product register has two n-bit sub-registers.

18. The device of claim 10, wherein each of said accumulators has three n-bit sub-registers.

19. The device of claim 10, wherein each of said inputs of said arithmetic logic unit has three sub-groups corresponding to three local buses.

20. A method to control a computation device for computation of a double accumulation of a product, comprising the steps of:

(a.) receiving an instruction into a control unit for the double accumulation of the product;

(b.) applying the contents of a product register using said control unit to a first input with a shifter of an arithmetic logic unit, and applying the contents of a first accumulator using said control unit to a second input of said arithmetic logic unit;

(c.) activating a control signal on a first circuit using said control unit to select one of at least two registers of said first circuit to memorize and propagate a carry value;

(d.) initializing said shifter using said control unit with an n-bit shift towards the left;

(e.) performing a computation using said arithmetic logic unit, and memorizing the result in said first accumulator and one of said registers as said carry value;

(f.) initializing said shifter using said control unit with an n-bit shift to the right;

(g.) applying the contents of a second accumulator using said control unit to said second input of said arithmetic logic unit;

(h.) adding the contents in said first and second inputs of said arithmetic logic unit with said carry value memorized in one of said registers using said arithmetic logic unit, and accumulating the result in said second accumulator; and (i.) applying said carry value memorized in one of said registers to an input of a multiplier using a second circuit in order to integrate said carry value into a multiplication stage, and memorizing the result of said multiplication stage in said product register.

21. The method of claim 20, wherein said first circuit comprises a multiplexer/demultiplexer connected to receive said carry value of said arithmetic and logic unit, said multiplexer/demultiplexer having first and second channels, said first channel connected to receive the output of one of said registers, said second channel connected to receive the output of the other of said registers, wherein one of said control signals activates either said first or second channel.

22. The device of claim 20, wherein said shifter is a barrel shifter.

23. The device of claim 20, wherein said registers of said first circuit define a conditions register associated with said arithmetic and logic unit, wherein said conditions register is connected to memorize and deliver information elements delivered or used by said arithmetic and logic unit.

24. The device of claim 20, wherein said multiplier is a parallel multiplier.

25. The device of claim 20, further comprising the step of: before step (i.), delivering operands using at least two source registers to at least two additional inputs of said multiplier.

26. The device of claim 20, wherein said second circuit is an AND logic gate.

27. The device of claim 20, wherein said product register has two n-bit sub-registers.

28. The device of claim 20, wherein each of said accumulators has three n-bit sub-registers.

29. The device of claim 20, wherein each of said inputs of said arithmetic logic unit has three sub-groups corresponding to three local buses.

* * * * *